United States Patent [19]
Herbrand et al.

[11] 3,859,505
[45] Jan. 7, 1975

[54] ELECTRICALLY HEATED BOILER WITH PERFORATED RACK AND AN ADJUSTABLE HEAT SHIELD

[76] Inventors: Lois A. Herbrand, Rt. 2, Box 2347, Spanaway, Wash. 98387; George Spector, 3615 Woolworth Bldg., 233 Broadway, New York, N.Y. 10007

[22] Filed: Oct. 12, 1973

[21] Appl. No.: 406,009

[52] U.S. Cl.............. 219/433, 99/415, 99/417, 99/448, 219/386, 219/430, 219/432, 219/436, 219/461, 222/146 HE
[51] Int. Cl............................................. F27d 11/02
[58] Field of Search .......... 219/386, 387, 400, 429, 219/430, 431, 432, 433, 436, 438, 439, 461; 99/410, 417, 415, 416, 448, 450; 220/19; 222/146 HE

[56] References Cited
UNITED STATES PATENTS

| | | | |
|---|---|---|---|
| 117,356 | 7/1871 | Whitehouse | 99/417 |
| 797,660 | 8/1905 | Brooks | 99/415 X |
| 1,454,856 | 5/1923 | O'Brien | 99/416 X |
| 1,650,999 | 11/1927 | Preston | 219/432 |
| 1,659,721 | 2/1928 | Chauncey | 99/417 X |
| 1,694,570 | 12/1928 | Watts | 219/433 |
| 2,424,161 | 7/1947 | Gunther | 219/433 |
| 2,430,715 | 11/1947 | Grayson | 219/433 |
| 2,556,115 | 6/1951 | Smith | 99/417 |
| 2,650,536 | 9/1953 | Russell | 99/416 |
| 2,652,768 | 9/1953 | Moreno | 99/417 |
| 2,682,602 | 6/1954 | Huck | 219/433 |
| 2,785,277 | 3/1957 | Jepson | 99/410 X |
| 3,282,460 | 11/1966 | Boznango | 220/19 |
| 3,325,058 | 6/1967 | West, Jr. | 222/146 HE |
| 3,641,926 | 2/1972 | Williams et al. | 99/448 |
| 3,749,000 | 7/1973 | Vidjah et al. | 99/425 |
| 3,764,780 | 10/1973 | Ellis | 219/430 |

*Primary Examiner*—Volodymyr Y. Mayewsky

[57] ABSTRACT

A boiler of relatively large enough size so to be able to hold twenty one-quart jars so to boil them during a home canning operation; the boiler including a pair of racks for placement one above the other, each rack holding some of the jars, a removable lid on top, and a portable electric stove designed particularly to fit under the boiler.

1 Claim, 5 Drawing Figures

Patented Jan. 7, 1975
3,859,505
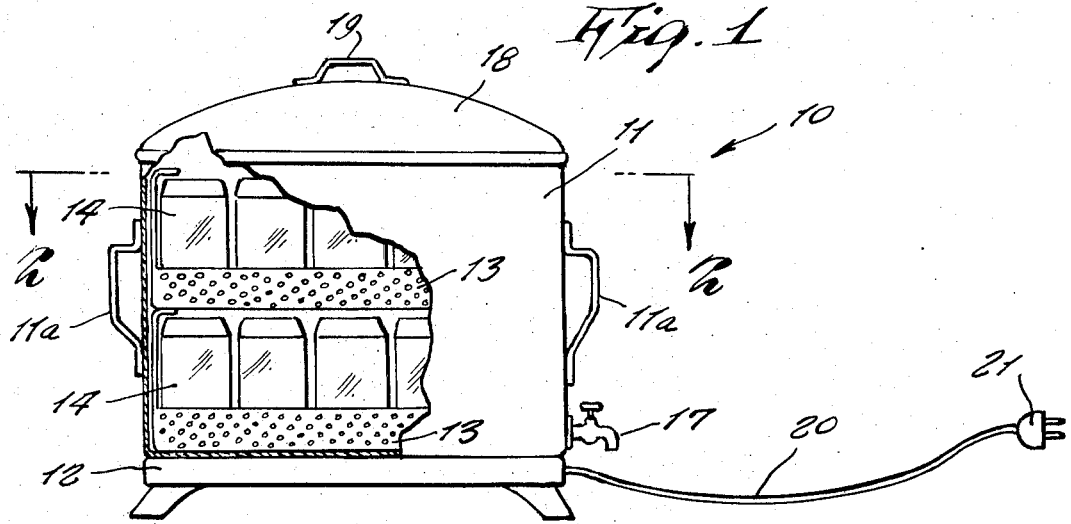
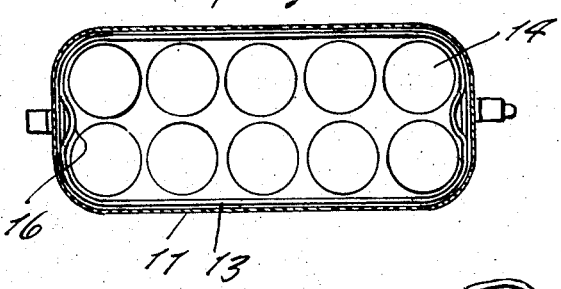
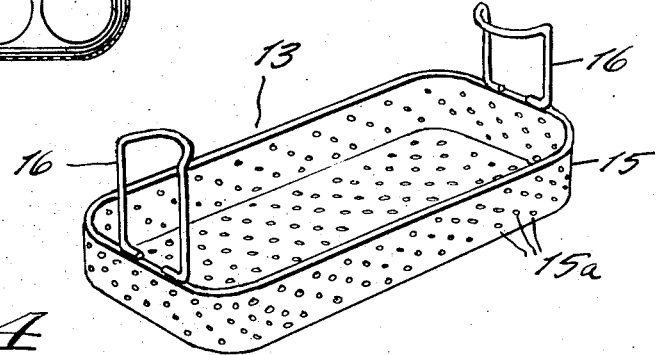
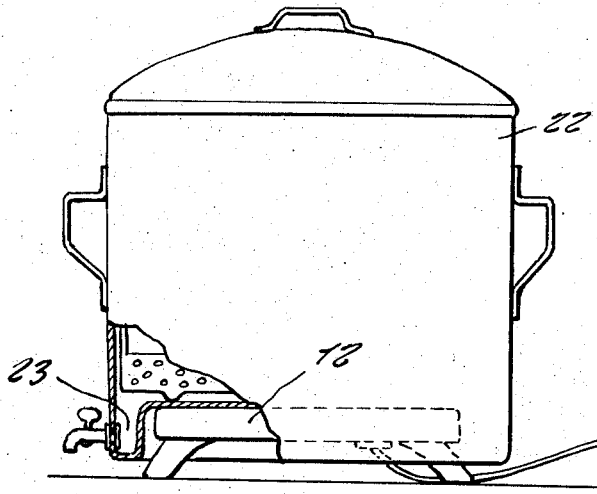
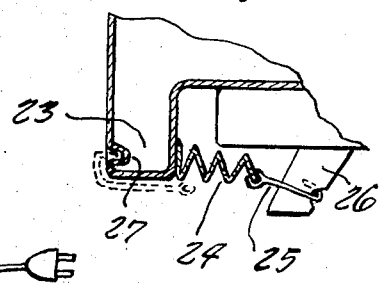

ELECTRICALLY HEATED BOILER WITH PERFORATED RACK AND AN ADJUSTABLE HEAT SHIELD

This invention relates generally to home canning equipment. More specifically it relates to a boiler.

It is generally well known to most women who do home canning of foods, especially in the autumn when fruits and vegetables have ripened in the garden, that they can handle only a few jars at a time, because after being filled, they must fit into as large a pot that she has available, so that they can be boiled for approximately 3 hours. This makes it difficult to preserve a large quantity in one day, and the burners on her stove are thus occupied most of the day so that they cannot be used for the usual daily cooking, if she uses more than one pot. This situation is objectionable, and therefore in want of an improvement.

As a result many women try to find, in old junk or antique shops, the old large copper boilers such as was used a generation ago to boil laundry on top of a stove, and which can handle a larger number of jars than the typical large pot in a home. However not many of these old copper boilers can now be found anymore, so that the situation is unresolved for most women.

Accordingly it is a principle object of the present invention to provide a time saver that includes a boiler large enough so to hold up to 20 1-quart jars for boiling at one time so that a large quantity of foods can be preserved at once without tying up a stove all day.

Another object is to provide a time saver that includes a portable electric stove designed particularly to fit under the boiler for maximum heat efficiency, and which can be plugged into any handy electric outlet socket of a house, so that the home stove is free for its daily chores, and wherein the portable electric stove accordingly can be even placed outside of the house, if desired, so to not overheat the home, if weather is hot.

Other objects are to provide a time saver which is simple in design, inexpensive to manufacture, rugged in construction, easy to use and efficient in operation.

These and other objects will be readily evident upon a study of the following specification and the accompanying drawing wherein:

FIG. 1 is a side view of the invention shown partly in cross section.

FIG. 2 is a cross section on line 2—2 of FIG. 1.

FIG. 3 is a view of one of the trays.

FIG. 4 is a side view of a modified design of the invention in which the vessel extends down around the sides of the stove so to utilize all the heat by letting less to escape therearound, and thus cut down on the heating expense.

FIG. 5 is an enlarged detail of the structure shown in FIG. 4 wherein additionally there is a foldable bottom shield that extends under the side area of the stove so to further retain all the cooking heat.

Refering now to the drawing in detail, and more particularly to FIGS. 1 to 3 at this time; the reference numeral 10 represents a time saver according to the present invention wherein there is a boiler 11 placable upon a portable electric stove 12.

The boiler is of size and shape so that two removable racks 13 can be placed inside; one over the other, each rack being able to hold 10 1-quart jars 14. Each rack comprises a tray 15 having perforations 15a to allow water to drip through, and having a raised wire handle 16 at each end which also serves to support the rack on top of it, as well as for lifting the rack from the boiler.

The boiler includes a spigot 17 for allowing water to drain out, and the boiler includes handles 11a on opposite ends, and a removable lid 18 having handle 19.

The stove 12 includes an electric burner connected by extension cord 20 to a plug 21.

In use, it is now evident that a large amount of preserving can be done at one time while keeping the kitchen stove free.

In FIG. 4, a modified design of boiler 22 includes a downward depending portion 23 around the lower edge thereof and into which the water has access, so to hug around the sides of the stove and thus additionally capturing all of the stove heat, for purpose of greater efficiency so to cut on the heating cost.

In FIG. 5, the same idea of FIG. 4 additionally includes an accordian pleated shield 24 attached to the depending portion 23 and which can be drawn under the peripheral area of the stove so to additionally capture even more of the stove heat and not let it to escape without heating the boiler. Hooks 25 on the shield edge serve to secure the pulled out shield to the stove legs 26, or when retracted in now-use position secure in dimples 27 of the boiler so to hold the shield in folded away position.

While various changes may be made in the detail construction, it is understood that such changes will be within the spirit and scope of the present invention as is defined by the appended claims.

What is claimed is:

1. A portable boiler containing water in combination with a pair of similar racks and a portable electric heater, each rack adapted to hold a plurality of jars, said boiler having an encompassing side wall integral with a heat conductive bottom wall and including a removable top enclosure, each of said racks comprising a perforated bottom wall and a perforated peripheral wall which fits snugly within the boiler side wall, each rack having a pair of raised handles extending upwardly from opposite ends of each rack having portions extending inwardly providing a pair of supports whereby one rack may be stacked above the other rack above the bottom wall providing thereby a two tiered construction, said electric heater supporting the boiler under the bottom wall of the boiler, said side wall of the boiler extending downwardly below the heater whereby the heater is encompassed by an annular jacket to more efficiently transfer heat from the heater to the boiler, and an adjustable heat shield attached to the jacket for further enclosing the heater.

* * * * *